United States Patent
Kumar et al.

(10) Patent No.: US 9,262,682 B2
(45) Date of Patent: *Feb. 16, 2016

(54) EXTRACTING CARD DATA WITH CARD MODELS

(71) Applicant: GOOGLE INC., Mountain View, CA (US)

(72) Inventors: Sanjiv Kumar, White Plains, NY (US); Henry Allan Rowley, Sunnyvale, CA (US); Xiaohang Wang, Jersey City, NJ (US); Jose Jeronimo Moreira Rodrigues, Lisbon (PT)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/645,410

(22) Filed: Mar. 11, 2015

(65) Prior Publication Data

US 2015/0186740 A1  Jul. 2, 2015

Related U.S. Application Data

(63) Continuation of application No. 14/461,001, filed on Aug. 15, 2014, now Pat. No. 8,995,741, which is a continuation of application No. 14/059,151, filed on Oct. 21, 2013, now Pat. No. 8,831,329.

(60) Provisional application No. 61/841,268, filed on Jun. 28, 2013.

(51) Int. Cl.
  *G06K 9/00* (2006.01)
  *G06K 9/18* (2006.01)
  (Continued)

(52) U.S. Cl.
  CPC ............ *G06K 9/186* (2013.01); *G06K 9/00469* (2013.01); *G06K 9/00536* (2013.01);
  (Continued)

(58) Field of Classification Search
  CPC ......... G06K 9/18; G06K 9/6267; G06K 9/66; G06T 3/0012
  See application file for complete search history.

(56) References Cited

U.S. PATENT DOCUMENTS 8,831,329 B1 * 9/2014 Kumar et al. .................. 382/139
8,995,741 B2 * 3/2015 Kumar et al. .................. 382/139
(Continued)

OTHER PUBLICATIONS

Datta, "Credit Card Processing Using Cell Phone Images", Department of Electrical Engineering, Stanford University,, Jan. 1, 2011, 1-7.

(Continued)

*Primary Examiner* — Gregory M Desire
(74) *Attorney, Agent, or Firm* — Johnson, Marcou & Isaacs, LLC

(57) ABSTRACT

Embodiments herein provide computer-implemented techniques for allowing a user computing device to extract financial card information using optical character recognition ("OCR"). Extracting financial card information may be improved by applying various classifiers and other transformations to the image data. For example, applying a linear classifier to the image to determine digit locations before applying the OCR algorithm allows the user computing device to use less processing capacity to extract accurate card data. The OCR application may train a classifier to use the wear patterns of a card to improve OCR algorithm performance. The OCR application may apply a linear classifier and then a nonlinear classifier to improve the performance and the accuracy of the OCR algorithm. The OCR application uses the known digit patterns used by typical credit and debit cards to improve the accuracy of the OCR algorithm.

20 Claims, 9 Drawing Sheets

(51) Int. Cl.
*G06K 9/62* (2006.01)
*G06K 9/66* (2006.01)
*G06T 3/00* (2006.01)
*G06Q 20/22* (2012.01)
*G06Q 20/34* (2012.01)
*G07F 7/08* (2006.01)
*G06K 9/32* (2006.01)

(52) U.S. Cl.
CPC ............... *G06K 9/18* (2013.01); *G06K 9/3258* (2013.01); *G06K 9/6267* (2013.01); *G06K 9/66* (2013.01); *G06Q 20/227* (2013.01); *G06Q 20/34* (2013.01); *G06T 3/0012* (2013.01); *G07F 7/0893* (2013.01)

(56) References Cited

U.S. PATENT DOCUMENTS

| | | | |
|---|---|---|---|
| 2004/0057619 A1* | 3/2004 | Lim | G06K 9/033 382/182 |
| 2006/0230004 A1 | 10/2006 | Handley | |
| 2007/0142035 A1 | 6/2007 | Lee | |
| 2008/0056572 A1* | 3/2008 | Nielsen | G06K 9/6224 382/173 |
| 2008/0298635 A1 | 12/2008 | West | |
| 2010/0054585 A1 | 3/2010 | Guillou et al. | |
| 2012/0143760 A1 | 6/2012 | Abulafia et al. | |
| 2012/0239542 A1 | 9/2012 | Preston et al. | |
| 2013/0004076 A1 | 1/2013 | Koo et al. | |
| 2013/0114890 A1 | 5/2013 | Saund | |
| 2013/0195376 A1 | 8/2013 | Baheti et al. | |
| 2014/0122479 A1* | 5/2014 | Panferov | G06F 3/0643 707/736 |
| 2015/0110362 A1* | 4/2015 | Amtrup | G06K 9/00469 382/112 |

OTHER PUBLICATIONS

Desire, "Office Action issued in copending U.S. Appl. No. 14/059,151, filed Oct. 21, 2013", Jan. 13, 2014, 1-10.
Desire, "Office Action issued in copending U.S. Appl. No. 14/461,001, filed Aug. 15, 2014", Oct. 2, 2014, 1-6.
Jacob, "Identification Numbers and Check Digit Algorithms", www.codeproject.com/Articles/459507/Identification-numbers-and-check-digit-algorithms, Sep. 20, 2012, 1-11.
Unknown, "TVCG Submission—Video Snapshots: Creating High-Quality Images from Video Clips", web: http://www.eecs.harvard.edu/~kalyans/research/snapshots/supplementary/results.html, May 18, 2013, 1-17.
Unknown, "Understanding Optical Character Recognition (OCR)", www.adcnordic.com/news/ocr.php, Jan. 1, 2002, 1-7.
U.S. Appl. No. 14/059,071 to Kumar et al. filed Oct. 21, 2013.
U.S. Appl. No. 14/059,108 to Kumar et al. filed Oct. 21, 2013.
U.S. Appl. No. 14/091,093 to Rowley et al. filed Nov. 26, 2013.
U.S. Appl. No. 14/551,883 to Wang et al. filed Nov. 24, 2014.
U.S. Appl. No. 14/551,991 to Wang et al. filed Nov. 24, 2014.

* cited by examiner

EXTRACTING CARD DATA WITH CARD MODELS

RELATED APPLICATIONS

This patent application is a continuation of and claims priority to U.S. patent application Ser. No. 14/461,001, filed Aug. 15, 2014, and entitled "Extracting Card Data With Card Models," which is a continuation of and claims priority to U.S. patent application Ser. No. 14/059,151 filed Oct. 21, 2013, and entitled "Extracting Card Data With Card Models," which also claims priority under 35 U.S.C. §119 to U.S. Provisional Patent Application No. 61/841,268 filed Jun. 28, 2013, and entitled "Hierarchical Classification in Credit Card Data Extraction." The entire contents of the above-identified priority applications are hereby fully incorporated herein by reference.

TECHNICAL FIELD

The technology disclosed herein pertains to extracting financial card information, and more particularly to using classifiers to improve accuracy and reduce required processor capacity.

BACKGROUND

When a consumer makes an online purchase or a purchase using a mobile device, they are often forced to enter credit card information into the mobile device for payment. Due to the small screen size and keyboard interface on a mobile device, such entry is generally cumbersome and prone to errors. Users may use many different cards for purchases, such as credit cards, debit cards, stored value cards, and other cards. Information entry difficulties are multiplied for a merchant attempting to process mobile payments on mobile devices for multiple transactions.

Current applications for obtaining payment information or other card data from a payment card requires a certain amount of processing capacity from the user computing device. Many current methods for extracting the card data from the image require an amount of processing capacity that is greater than the user computing device can easily provide. The strain on the processing capacity may cause delays, errors, battery drain, and other processor problems.

Current applications do not allow various classifications, models, and machine learning algorithms to be used for more accurate results.

SUMMARY

The technology of the present disclosure includes computer-implemented methods, computer program products, and systems for extracting card information. Extracting card information comprises receiving, by one or more computing devices, an image of a card from a camera; identifying a first area of the image, the first area being selected as a potential location of a digit on the card in the image; performing a linear classification algorithm on data encompassed by the first area; determining a confidence level of a first result of the application of the linear classification algorithm to the first area; determining that the first area encompasses a digit upon determining that the confidence level of the first result is over a configured threshold; and performing an optical character recognition algorithm on the first area upon a determination that the first area encompasses the digit. Another example may train a classifier to use the wear patterns of a card to improve optical character recognition ("OCR") algorithm performance. Another example may apply a linear classifier and then a nonlinear classifier to improve the performance and the accuracy of the OCR algorithm. Another example uses the known digit patterns used by typical credit and debit cards to improve the accuracy of the OCR algorithm.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

Figure 1:
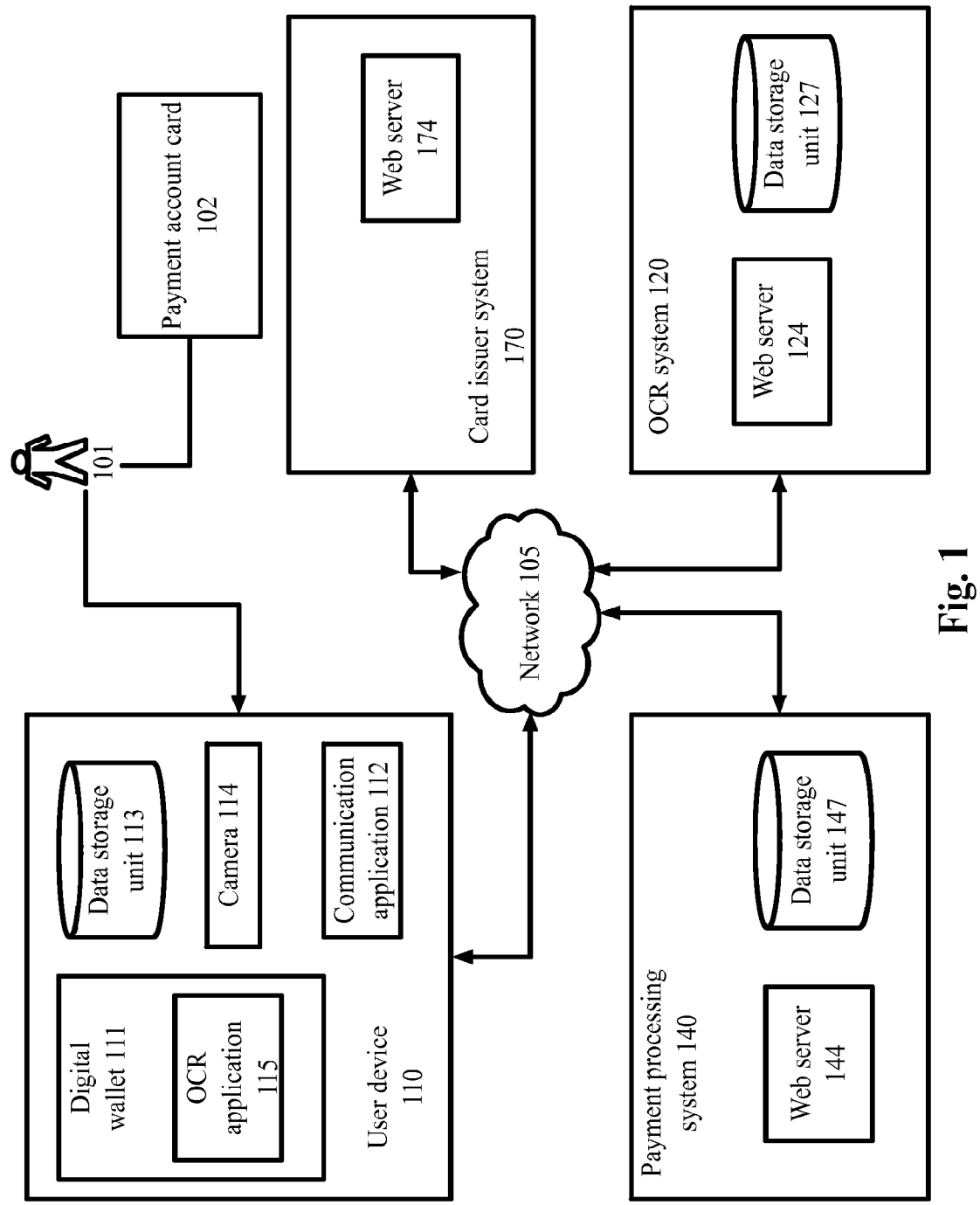
FIG. 1 is a block diagram depicting a system for extracting account information from a card, in accordance with certain example embodiments of the technology disclosed herein.

Embodiments herein provide computer-implemented techniques for allowing a user computing device to extract financial card information using optical character recognition ("OCR"). The process of extracting financial card information may be improved by applying various classifiers and other transformations to the image data. For example, applying a linear classifier to the image to determine digit locations before applying the OCR algorithm allows the user computing device to use less processing capacity to extract accurate card data. The OCR application may compare typical wear patterns to train a classifier. The OCR application may use the wear patterns of a user to improve OCR algorithm performance. The OCR application may apply a linear transformation and then a nonlinear transformation to improve the performance and the accuracy of the OCR algorithm. The linear transformation may reduce the dimensionality of the data to reduce processing requirements, and the nonlinear transformation may improve the accuracy of the resulting data. The OCR application may use card models to improve the accuracy of the OCR algorithm. For example, the OCR application may use the known digit patterns used by typical credit and debit cards to improve the accuracy of the OCR algorithm.

Throughout the specification, the general term "card" will be used to represent any type of physical card instrument, such as a magnetic stripe card. In example embodiments, the different types of card represented by "card" can include credit cards, debit cards, stored value cards, loyalty cards, identification cards, or any other suitable card representing an account or other record of a user or other information thereon. Example embodiments described herein may be applied to the images of other items, such as receipts, boarding passes, tickets, and other suitable items. The card may also be an image or facsimile of the card. For example, the card may be a representation of a card on a display screen or a printed image of a card.

The user may employ the card when making a transaction, such as a purchase, ticketed entry, loyalty check-in, or other suitable transaction. The user may obtain the card information for the purpose of importing the account represented by the card into a digital wallet application module or for other digital account purposes. The card is typically a plastic card containing the account information and other data on the card. In many card embodiments, the customer name, expiration date, and card numbers are physically embossed on the card. The embossed information is visible from both the front and back of the card, although the embossed information is typically reversed on the back of the card.

A user may desire to enter the information from the card into a mobile user computing device or other computing device, for example, to conduct an online purchase, to conduct a purchase at a merchant location, to add the information to a wallet application on a user computing device, or for any other suitable reason. In an example, the user desires to use a mobile user computing device to conduct a purchase transaction using a digital wallet application module executing on the mobile user computing device. The digital wallet application module may require an input of the details of a particular user payment account to conduct a transaction with the particular user payment account or to set up the account. Due to the small screen size and keyboard interface on a mobile device, such entry can be cumbersome and error prone. Additionally, a merchant system may need to capture card information to conduct a transaction or for other reasons.

In addition to account identifiers, the front of the card typically contains logos of the issuer of the card, pictures chosen by the user or the issuer, other text describing the type or status of the user account, a security code, and other marketing and security elements, such as holograms or badges. The user name, card expiration date, and the account identifier, such as a credit card number, may be embossed on the front of the card such that the information protrudes from the front of the card.

The user employs a mobile phone, digital camera, or other user computing device to capture a scan of the card associated with the account that the user desires to input into the user computing device.

An OCR application on the user computing device receives a scan of the card. The scan, or digital scan, may be a video of the card, a series of images of the card, or data from any other suitable scanning technology. The image may be obtained from the camera module of a user computing device, such as the camera on a mobile phone. The images may be obtained from any digital image device coupled to the user computing device or any other suitable digital imaging device. The images may be accessed by the OCR application on the user computing device from a storage location on the user storage device, from a remote storage location, or from any suitable location. All sources capable of providing the image will be referred to as a "camera."

An OCR application receives the images of the card from the camera. The functions of the OCR application may be performed by any suitable module, hardware, software, or application operating on the user computing device. Some, or all, of the functions of the OCR application may be performed by a remote server or other computing device, such as the server operating in an OCR system. For example, a digital wallet application module on the user computing device may obtain the images of the card and transmit the images to the OCR system for processing. In another example, some of the OCR functions may be conducted by the user computing device and some by the OCR system or another remote server. Examples provided herein may indicate that many of the functions are performed by an OCR application on the user computing device, but some or all of the functions may be performed by any suitable computing device.

The image of the card is presented on the user interface of the user computing device as a live video image of the card. The OCR application can isolate and store one or more images from the video feed of the camera. The OCR application may store a scan of the card as a video or other suitable format comprising multiple images of the card. For example, the user may hover the camera function of a user computing device over a financial card and observe the representation of the financial card on the user interface of the user computing device. The user may actuate a real or virtual button on the user computing device to capture a preferred image or group of images. The OCR application may select the preferred images automatically.

In certain examples, some or all of the functions described are performed while the scan is active. For example, the user may hover the camera of a user computing device over the card and the methods described herein are performed with live images of the card. That is, the OCR application captures and utilizes images from the active feed of the camera.

The OCR application, the camera module, or the user computing device, or other computing device performs blur detection on the images. The image may be recognized as blurry, overly bright, overly dark, or otherwise obscured in a manner that prevents a high resolution image from being obtained. The OCR application, or other function of the user computing device or the camera, may adjust the image capturing method to reduce the blur in the image. For example, the OCR application may direct the camera to adjust the focus on the financial card. In another example, the OCR application may direct the user to move the camera closer to, or farther away from, the financial card. In another example, the OCR application may perform a digital image manipulation to remove the blur. Any other method of correcting a blurred image can be utilized.

The OCR application may crop the images to display only the desired information from the card. In an example, if the card in the image is a credit card, the OCR application accesses information associated with the expected location of the account number of a credit card. The expected location may be obtained from a database of card layouts stored on the user computing device or in another suitable location. For example, credit cards, driver's licenses, loyalty cards, and other cards typically meet an industry or issuer standard for the data locations and the layout of the card. The standards may be stored in the OCR application or in a location accessible by the OCR application.

The OCR application isolates a small window on the card. The window may be located in an area where a digit is expected to be located. The window may be slightly larger than the expected digit to allow an entire digit to be encompassed by the window, but not so large as to encompass more than one digit or more than a limited number of digits. Other windows may be utilized that encompass multiple digits.

The OCR application applies a linear classifier or other suitable classifier to the window. The OCR application may use a simple linear support vector machine ("SVM") to distinguish a digit from the background. An SVM is a machine learning tool that may utilize algorithms to analyze data and recognize patterns. The SVM linear classifier the OCR application applies to the window may use less processing capacity from the user computing device than a more typical OCR algorithm. Any suitable machine learning tool may be used to distinguish the digits in addition to, or in place of, the SVM.

The classifier determines a confidence level that the image in the window is a digit. For example, if the window completely encompasses a single digit, the classifier may determine that the image is likely to be a digit and provide a high confidence level. The OCR application, or another suitable party, may configure a threshold value for determining if the window encompasses a digit. Alternatively, one can sort the classification scores over all the windows and pick a configured number of the top scoring windows as desired.

If the results of the classifier determine that the confidence level is under a threshold, then the OCR application shifts and/or resizes the window position on the image. The OCR application may shift the window location by as little as a pixel on the image or by any other distance. The OCR application may shift the window horizontally, vertically, or diagonally. The OCR application may alter the size of the window. Any suitable revision to the window may be performed.

The OCR application applies the linear classifier to the new window. The OCR application may shift the window and run linear classifiers until all the locations of all digits are identified and the confidence levels within those locations are all over the threshold. Additionally or alternatively, all possible locations of the image may be analyzed.

If the results of the linear classifier indicate that the confidence level is over a threshold, then the OCR application applies an OCR algorithm to the digits in the selected window locations. The OCR application may apply the OCR algorithm to all of the windows or digits that are over the confidence level, to an individual window or digit, or to any portion of the card image.

The OCR application supplies the extracted data to a requestor, such as a digital wallet application module, point of sale terminal, payment processing system, website, or any suitable application or system that the user desires. The extracted data may be used by an application on the user computing device. The extracted data may be transmitted via an Internet connection over the network, via a near field communication ("NFC") technology, emailed, texted, or transmitted in any suitable manner.

In another example embodiment, the OCR system trains an SVM classifier to identify wear patterns on cards. Embossed digits, printed digits, and other digits on a card often become distressed over a period time. One source of distress is wear from being inserted into and out of a wallet, purse, pocket, or other enclosure. The digits can develop a wear pattern from being forced into an enclosure repeatedly. For example, if a user forces a credit card into a slot in a wallet from the top down, the card can develop a wear pattern from the friction of the card on the wallet material.

The OCR system or any other suitable system may train a classifier to identify the wear patterns. The classifier may be trained by receiving data from an operator or another suitable party. In an example, the classifier analyzes images of cards. The images may be taken from actual card scans, generated by a computer, designed by an operator, taken from a demonstration group, or obtained from any suitable source. The classifier may identify digits in a manner as described herein or in any suitable manner.

The OCR system operator, a user, or another suitable party may provide corrections for incorrectly classified digits. The operator may view the results of a classification on a user interface of the OCR system and correct classification errors. For example, a window may be classified as not containing a digit when a digit was completely contained in the window but worn away sufficiently that the OCR system does not detect the digit. The operator instructs the classifier that the window did contain a digit. The classifier learns that the characteristics indicated by the classification of the window are to be incorporated in future classifications. The classifier learns from the corrections to more accurately interpret the image data. For example, a particular wear pattern may wear off a bottom half of a digit. The OCR system will interpret a window encompassing the digit as not containing an entire digit, because the bottom half of the digit is missing. However, the top half of the supplied digit can be used to interpret the whole digit, and the classifier can be instructed to recognize the whole digit based on the top half of the supplied digit. Additionally, the classifier can be instructed to identify the top half of digits in other windows (or when analyzing other cards) and to supply the missing bottom half of the digit based on the applied wear pattern.

In an example, the classifier learns to interpret data from the images of cards that have distressed digits. For example, the digits may have a wear pattern that was created by sliding the card into a holder. The classifier may be instructed to recognize the wear patterns. The classifier may further be instructed to categorize the wear patterns. For example, a wear pattern may be associated with a category such as "top down wear." top down wear might be indicated by a wear pattern that is created when a card is repeatedly inserted into a holder in that manner. Other wear pattern categories might include "left side horizontal wear," "diagonal wear," "bottom up wear," or in any suitable category.

The OCR system may create transformations to apply to classification data. For example, the OCR system may learn what optical effect each category of wear pattern creates in the card image and, in particular, to specific digits. The OCR system may create a transformation to apply to classification data that allows the classification data to be rectified, or otherwise revised, to a standard digit image.

The OCR application employs the learned algorithm for the classifier. The OCR application may use a linear classifier on a card image as described herein and determine the confidence level of the result.

The OCR application applies a transformation to the linear classification of the data, such as a Top Down Wear transformation. For example, in a "top down wear" transformation, the OCR application will identify the bottom portion of a number (in other words, a number missing at least a portion of the top of the number). Then, using the bottom portion of the number, the OCR application can identify the entire number. The OCR application may determine if the confidence level of the result improves after the top down wear transformation. If the confidence level improves, then the OCR application determines that the card in the image has a wear pattern associated with the top down wear pattern.

The OCR application may apply any or all of the wear pattern transformations and determine the confidence level of each result. The OCR application selects the top performing result. The OCR application may additionally or alternatively combine wear pattern transformations in any combination that provide a suitable result. For example, if a user randomly places card in his card holder, then that user's cards may exhibit multiple wear patterns.

After determining the wear pattern associated with the card of the user, the OCR application applies the wear pattern to all future card images. That is, when the user applies a classification and an OCR algorithm to future card images, the OCR application applies the determined wear pattern to the classification. The OCR application may assume that the user creates a similar wear pattern on all cards utilized by the user. For example, the user may store all cards in a similar manner in a wallet or other card holder. Thus, a similar wear pattern may be created on all cards of the user. The OCR application uses the predicted wear pattern to improve the accuracy and the speed of the OCR application.

In another aspect, the OCR application may apply linear and nonlinear transformation methods to the card images. The OCR application may apply the methods to the transformations or to the features of the image. Linear transformation methods may include techniques such as simple linear support vector machines ("SVM"), principal components analysis ("PCA"), and linear discriminant analysis ("LDA"). An example of nonlinear classification methods includes Random Fourier Feature Mapping ("RFFM").

The OCR application generates more accurate results with less processing requirements by combining linear and nonlinear transformation methods. The OCR application applies a linear transformation to the image data to reduce the dimensionality and then applies the nonlinear transformation to increase the accuracy of the results. Dimensionality reduction is the process of reducing the number of random variables under consideration. The main linear technique for dimensionality reduction, principal component analysis, performs a linear mapping of the data to a lower dimensional space in such a way that the variance of the data in the low-dimensional representation is maximized. The covariance matrix of the data is constructed and the eigenvectors on this matrix are computed. The eigenvectors that correspond to the largest eigenvalues (the principal components) can now be used to reconstruct a large fraction of the variance of the original data. The original space (with dimension of the number of points) has been reduced (with data loss, but hopefully retaining the most important variance) to the space spanned by a few eigenvectors.

In the example, the OCR application obtains a card image as described herein. The OCR application applies a linear transformation as described herein. The linear transformation method may be selected to reduce the dimensionality of the input features while minimizing the impact on the accuracy of the results. The OCR application may additionally or alternatively select a method that requires the least processing capacity from the user network device.

The OCR application obtains the results of the linear transformation and applies a nonlinear transformation method to the results. The nonlinear transformation method improves the accuracy of the data. By first reducing the dimensionality of the data with the linear transformation methods and applying the nonlinear transformation methods, the OCR application achieves higher accuracy with reduced processing costs.

After applying the transformation methods and applying the OCR algorithm as described herein, the OCR application applies a classification application to the results. Then, the OCR application supplies the relevant card information to a requestor as described herein.

In another example embodiment, the OCR application identifies lines of digits on an image and uses card models to predict digit locations on a card image. The OCR application obtains an image of a card as described herein. The OCR application applies a linear classifier to the image as described herein. The OCR application determines the potential digit locations. That is, the OCR application can score each potential digit window and select the windows most likely to contain a digit.

The OCR application identifies lines on the card image by fitting lines to the likely digits. That is, the OCR application may apply lines to the image that are fitted to the top or bottom of a series of digits. An example technique for robust detection of lines in presence of noisy window selection is Random Sample Consensus ("RANSAC").

For example, the digits comprising the user identification number of a credit card are typically printed or embossed in a line from left to right across the face of the card. The OCR application recognizes that the potential digits are arranged in a line or a series of lines. The OCR application may store the lines that are most likely to be lines of digits. For example, the OCR application may store the top scoring 3 or 4 lines.

The OCR application maintains a series of card models in a database or other storage location. The card models indicate the manner in which the digits are displayed on the card. For example, certain card issuers display the account numbers in a particular spacing configuration and at a certain location on the card. A certain card issuer may display the digits of the account number in a continuous string of digits without spaces. Another card issuer may display the digits of the account number in groups of 4 digits divided by spaces. Another card issuer may display the digits of the account number in groups of 4 digits with a double space in the center of the digits. Any suitable digit grouping may be identified and stored in the database.

The OCR application fits the card models to the image. The OCR application may fit the model along the lines stored from the image. That is, the OCR application fits the model along each of the lines that were determined to be likely digit location lines. In another example, the model is fit to every location on the card image. The model may be applied in a location against the left edge of the card and then shifted one pixel at a time horizontally or vertically to find the best fit. Any other method of fitting the model to the image may be employed.

The OCR application applies an OCR algorithm to the potential digit locations determined by the lines, the windows, and the models. The OCR application determines the best digit recognition scores from the OCR algorithm applications.

The OCR application determines the model that creates the best digit recognition scores. For example, a model that has the digits of the account number in groups of 4 digits may generate the best results. The OCR application may predict a credit card issuer that is associated with the account number groupings. The OCR application uses the knowledge of the credit card issuer to predict other data locations on the image or for any suitable validation, prediction, or verification purposes.

The OCR application selects the best digits located by the lines, the windows, and the models. The OCR application may select the best digits and supply the relevant card information to a requestor.

Example System Architecture

Turning now to the drawings, in which like numerals represent like (but not necessarily identical) elements throughout the figures, example embodiments are described in detail.

FIG. 1 is a block diagram depicting a system for extracting financial account information with relaxed card alignment and for extracting financial account information from multiple cards, in accordance with certain example embodiments. As depicted in FIG. 1, the system 100 includes network computing devices 110, 120, 140, and 170 that are configured to communicate with one another via one or more networks 105. In some embodiments, a user associated with a device must install an application and/or make a feature selection to obtain the benefits of the techniques described herein.

Each network 105 includes a wired or wireless telecommunication means by which network devices (including devices 110, 120, 140, and 170) can exchange data. For example, each network 105 can include a local area network ("LAN"), a wide area network ("WAN"), an intranet, an Internet, a mobile telephone network, or any combination thereof. Throughout the discussion of example embodiments, it should be understood that the terms "data" and "information" are used interchangeably herein to refer to text, images, audio, video, or any other form of information that can exist in a computer-based environment.

Each network computing device 110, 120, 140, and 170 includes a device having a communication module capable of transmitting and receiving data over the network 105. For example, each network device 110, 120, 140, and 170 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network devices 110, 120, 140, and 170 are operated by end-users or consumers, OCR system operators, payment processing system operators, and card issuer operators, respectively. In certain example embodiments, the various operators may have to download an application, activate a feature of an application, and/or otherwise enable an application to take advantage of the features described herein.

The user 101 can use the communication application 112, which may be, for example, a web browser application or a stand-alone application, to view, download, upload, or otherwise access documents or web pages via a distributed network 105. The network 105 includes a wired or wireless telecommunication system or device by which network devices (including devices 110, 120, 140, and 170) can exchange data. For example, the network 105 can include a local area network ("LAN"), a wide area network ("WAN"), an intranet, an Internet, storage area network (SAN), personal area network (PAN), a metropolitan area network (MAN), a wireless local area network (WLAN), a virtual private network (VPN), a cellular or other mobile communication network, Bluetooth, NFC, or any combination thereof or any other appropriate architecture or system that facilitates the communication of signals, data, and/or messages.

The user device 110 may employ a communication module 112 to communicate with the web server 124 of the OCR system 120 or other servers. The communication module 112 may allow devices to communicate via technologies other than the network 105. Examples might include a cellular network, radio network, or other communication network.

The user computing device 110 may include a digital wallet application module 111. The digital wallet application module 111 may encompass any application, hardware, software, or process the user device 110 may employ to assist the user 101 in completing a purchase. The digital wallet application module 111 can interact with the communication application 112 or can be embodied as a companion application of the communication application 112. As a companion application, the digital wallet application module 111 executes within the communication application 112. That is, the digital wallet application module 111 may be an application program embedded in the communication application 112.

The user device 110 may include an optical character recognition ("OCR") application 115. The OCR application 115 can interact with the communication application 112 or be embodied as a companion application of the communication application 112 and execute within the communication application 112. In an exemplary embodiment, the OCR application 115 may additionally or alternatively be embodied as a companion application of the digital wallet application module 111 and execute within the digital wallet application module 111. The OCR application 115 may employ a software interface that may open in the digital wallet application 111 or may open in the communication application 112. The interface can allow the user 101 to configure the OCR application 115 and the user account on the offer provider system 150.

The OCR application 115 can be used to analyze a card and extract information or other data from the card. The OCR system 120 or other system that develops the OCR algorithms or other methods may include a set of computer-readable program instructions, for example, using JavaScript, that enable the OCR system 120 to interact with the OCR application 115.

Any of the functions described in the specification as being performed by the OCR application 115 can be performed by the payment processing system 140, the OCR system 120, the user computing device 110, a merchant system (not pictured) or any other suitable hardware or software system or application.

The user device 110 includes a data storage unit 113 accessible by the OCR application 115 and the communication application 112. The exemplary data storage unit 113 can include one or more tangible computer-readable media. The data storage unit 113 can be stored on the user device 110 or can be logically coupled to the user device 110. For example, the data storage unit 113 can include on-board flash memory and/or one or more removable memory cards or removable flash memory.

The user device 110 may include a camera 114. The camera may be any module or function of the user computing device 110 that obtains a digital image. The camera 114 may be onboard the user computing device 110 or in any manner logically connected to the user computing device 110. The camera 114 may be capable of obtaining individual images or a video scan. Any other suitable image capturing device may be represented by the camera 114.

The payment processing system 140 includes a data storage unit 147 accessible by the web server 144. The example data storage unit 147 can include one or more tangible computer-readable storage devices. The payment processing system 140 is operable to conduct payments between a user 101 and a merchant system (not pictured). The payment processing system 140 is further operable to manage a payment account of a user 101, maintain a database to store transactions of the merchant system and the user 101, verify transactions, and other suitable functions.

The user 101 may use a web server 144 on the payment processing system 140 to view, register, download, upload, or otherwise access the payment processing system 140 via a website (not illustrated) and a communication network 105). The user 101 associates one or more registered financial card accounts, including bank account debit cards, credit cards, gift cards, loyalty cards, coupons, offers, prepaid offers, store rewards cards, or other type of financial account that can be used to make a purchase or redeem value-added services with a payment account of the user 101.

A card issuer, such as a bank or other institution, may be the issuer of the financial account being registered. For example, the card issuer may be a credit card issuer, a debit card issuer, a stored value issuer, a financial institution providing an account, or any other provider of a financial account. The payment processing system 140 also may function as the issuer for the associated financial account. The user's 101 registration information is saved in the payment processing system's 140 data storage unit 147 and is accessible the by web server 144. The card issuer employs a card issuer system 170 to issue the cards, manage the user account, and perform any other suitable functions. The card issuer system 170 may alternatively issue cards used for identification, access, verification, ticketing, or cards for any suitable purpose. The card issuer system 170 may employ a web server 174 to manage the user account and issuer cards 102.

The OCR system 120 utilizes an OCR system web server 124 operating a system that produces, manages, stores, or maintains OCR algorithms, methods, processes, or services. The OCR system web server 124 may represent the computer implemented system that the OCR web system 120 employs to provide OCR services to user computing devices 110, merchants, or any suitable part. The OCR system web server 124 can communicate with one or more payment processing systems 140, a user device 110, or other computing devices via any available technologies. These technologies may include, but would not be limited to, an Internet connection via the network 105, email, text, instant messaging, or other suitable communication technologies. The OCR system 120 may include a data storage unit 127 accessible by the web server 124 of the OCR system 120. The data storage unit 127 can include one or more tangible computer-readable storage devices.

Any of the functions described in the specification as being performed by the OCR system 120 can be performed by the OCR application 115, the user computing device 110, or any other suitable hardware or software system or application.

The user 101 may employ the card 102 when making a transaction, such as a purchase, ticketed entry, loyalty check-in, or other suitable transaction. The user 101 may obtain the card information for the purpose of importing the account represented by the card 102 into a digital wallet application module 111 of a computing device 110 or for other digital account purposes. The card 102 is typically a plastic card containing the account information and other data on the card 102. In many card 102 embodiments, the customer name, expiration date, and card numbers are physically embossed on the card 102. The embossed information is visible from both the front and back of the card 102, although the embossed information is typically reversed on the back of the card 102.

It will be appreciated that the network connections shown are exemplary and other means of establishing a communications link between the computers and devices can be used. Moreover, those having ordinary skill in the art having the benefit of the present disclosure will appreciate that the user device 110, OCR system 120, payment processing system 140, and card issuer system 170 illustrated in FIG. 1 can have any of several other suitable computer system configurations. For example, a user device 110 embodied as a mobile phone or handheld computer may not include all the components described above.

Example Processes

The example methods illustrated in FIGS. 2-7 are described hereinafter with respect to the components of the example-operating environment 100. The example methods of FIGS. 2-7 may also be performed with other systems and in other environments.

Figure 2:
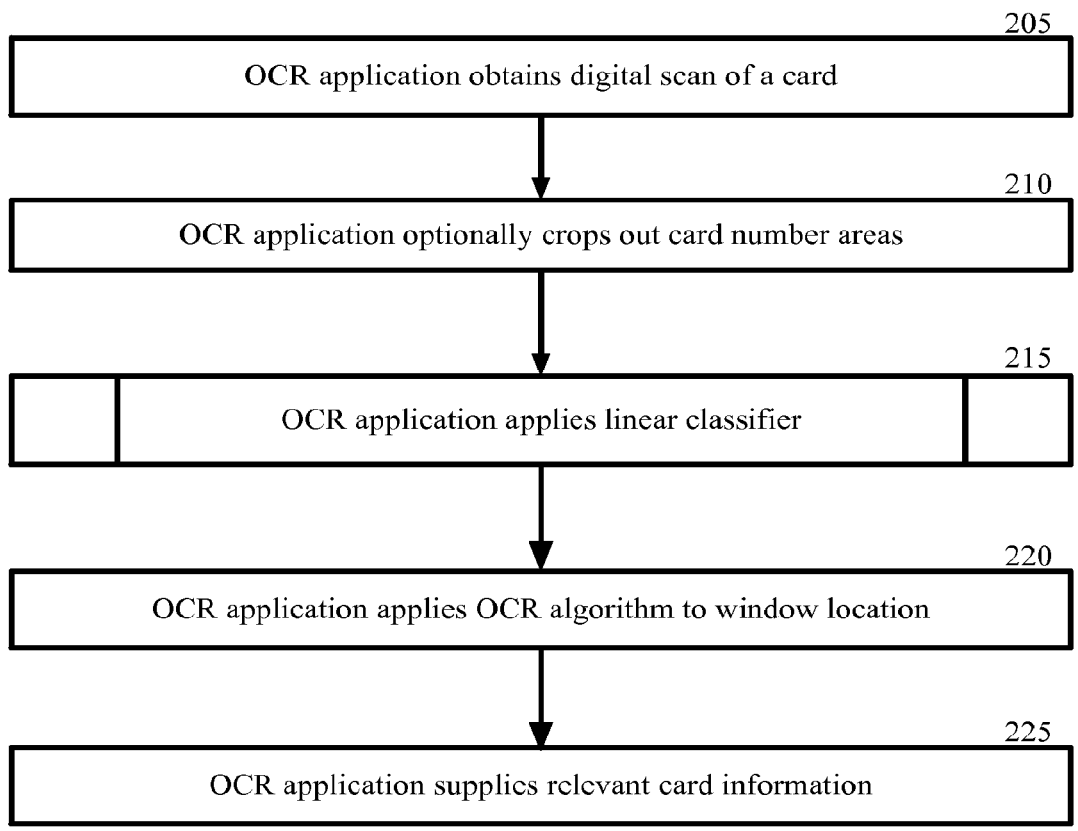
FIG. 2 is a block flow diagram depicting methods for extracting account information using a linear classifier, in accordance with certain example embodiments.

FIG. 2 is a block flow diagram depicting a method 200 for extracting account information using a linear classifier, in accordance with certain example embodiments.

With reference to FIGS. 1 and 2, in block 205, the optical character recognition ("OCR") application 115 on the user device 110 obtains a digital scan of a card 102. The user 101 employs a mobile phone, digital camera, or other user computing device 110 to capture an image of the card 102 associated with the account that the user 101 desires to input into the user computing device 110.

The OCR application 115 on the user computing device 110 receives the image of the card 102. The image may be obtained from the camera module of the user computing device 110, such as the camera 114 on a mobile phone. The image may be obtained from a scanner coupled to the user computing device 110 or any other suitable digital imaging device. The image may be obtained from video captured by the user computing device 110. The image may be accessed by the OCR application 115 on the user computing device 110 from a storage location on the user computing device 110, from a remote storage location, or from any suitable location. All sources capable of providing the image will be referred to herein as a "camera" 114.

The functions of the OCR application 115 may be performed by any suitable module, hardware, software, or application operating on the user computing device 110. Some, or all, of the functions of the OCR application 115 may be performed by a remote server or other computing device, such as the server operating in an OCR system 120. For example, a digital wallet application module 111 on the user computing device 110 may obtain the images of the card and transmit the images to the OCR system 120 for processing. In another example, some of the OCR functions may be conducted by the user computing device 110 and some by the OCR system 120 or another remote server. Examples provided herein may indicate that many of the functions are performed by an OCR application 115 on the user computing device 110, but some or all of the functions may be performed by any suitable computing device.

The image is presented on the user interface of the user computing device 110 as a live video image of the card 102. The OCR application 115 can isolate and store one or more images from the video feed of the camera 114. For example, the user 101 may hover the camera 114 function of a user computing device 110 over the card 102 and observe the representation of the card on the user interface of the user computing device 110.

In block 210, the OCR application 115 may crop the image to display only the desired information from the card 102. For example, if the card 102 in the image is a credit card, the OCR application 115 accesses information associated with the expected location of the account number of a credit card. The expected location may be obtained from a database of card layouts stored on the user computing device 110 or in another suitable location. Credit cards, driver's licenses, loyalty cards, and other cards typically meet an industry standard or a particular issuer standard for the data locations and the layout of the card. The standards may be stored in the OCR application 115 or in a location accessible by the OCR application 115. In certain circumstances, the data locations may be provided by the issuer of the card 102.

Figure 8:
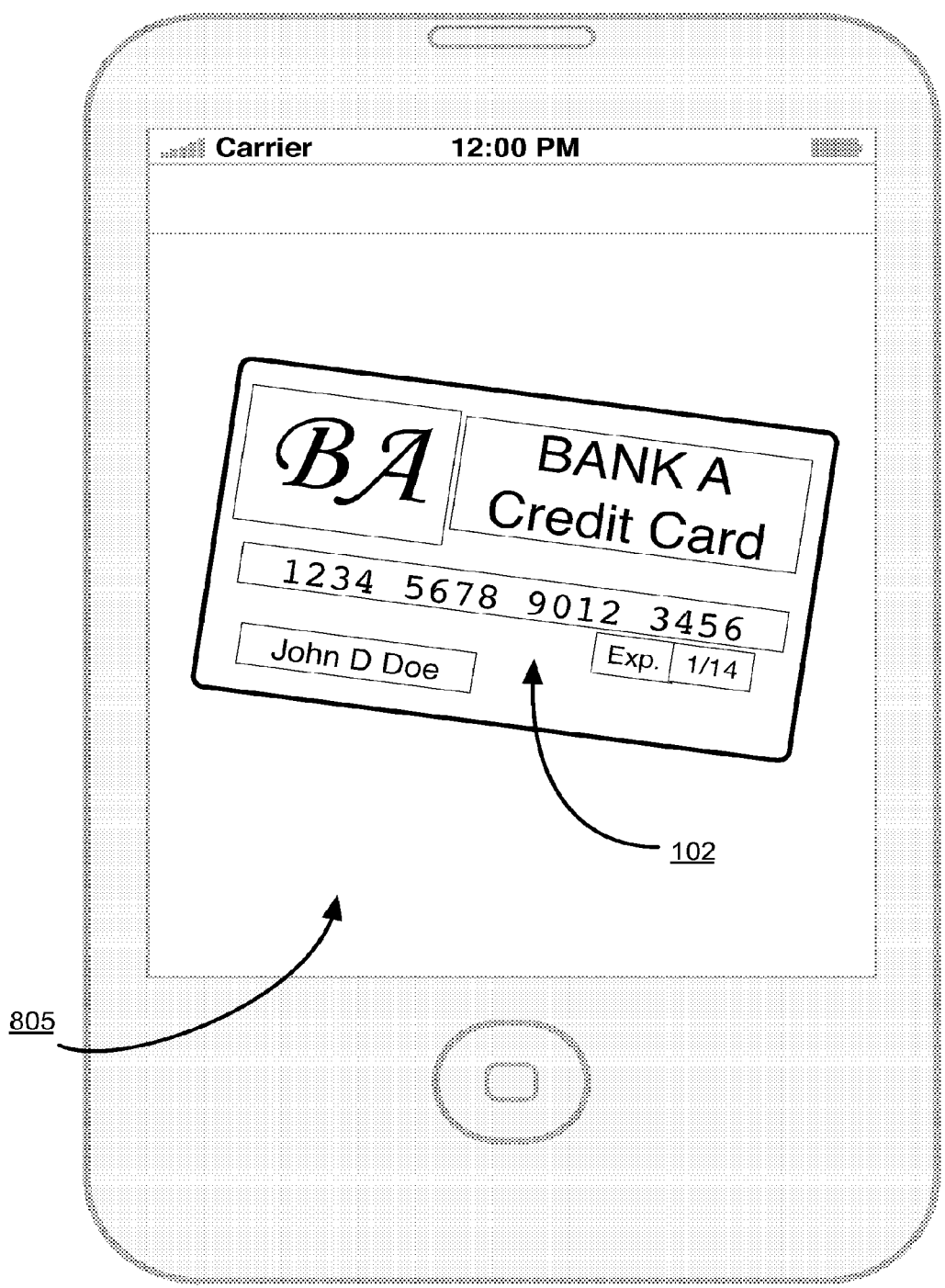
FIG. 8 is an illustration of a user computing device displaying an image of a financial card, in accordance with certain example embodiments

An illustration of the card 102 displayed on the user computing device is presented in FIG. 8.

FIG. 8 is an illustration of a user computing device 110 displaying an image of a financial card 102, in accordance with certain example embodiments. The user computing device 110 is shown as a mobile smartphone. The user computing device 110 is shown with a display screen 805 as a user interface. The card 102 is shown displayed on the user computing device 110.

Returning to FIG. 2, in block 215, the OCR application applies a linear classifier to the image data. The details of the method of block 215 are described in greater detail hereinafter with reference to FIG. 3.

Figure 3:
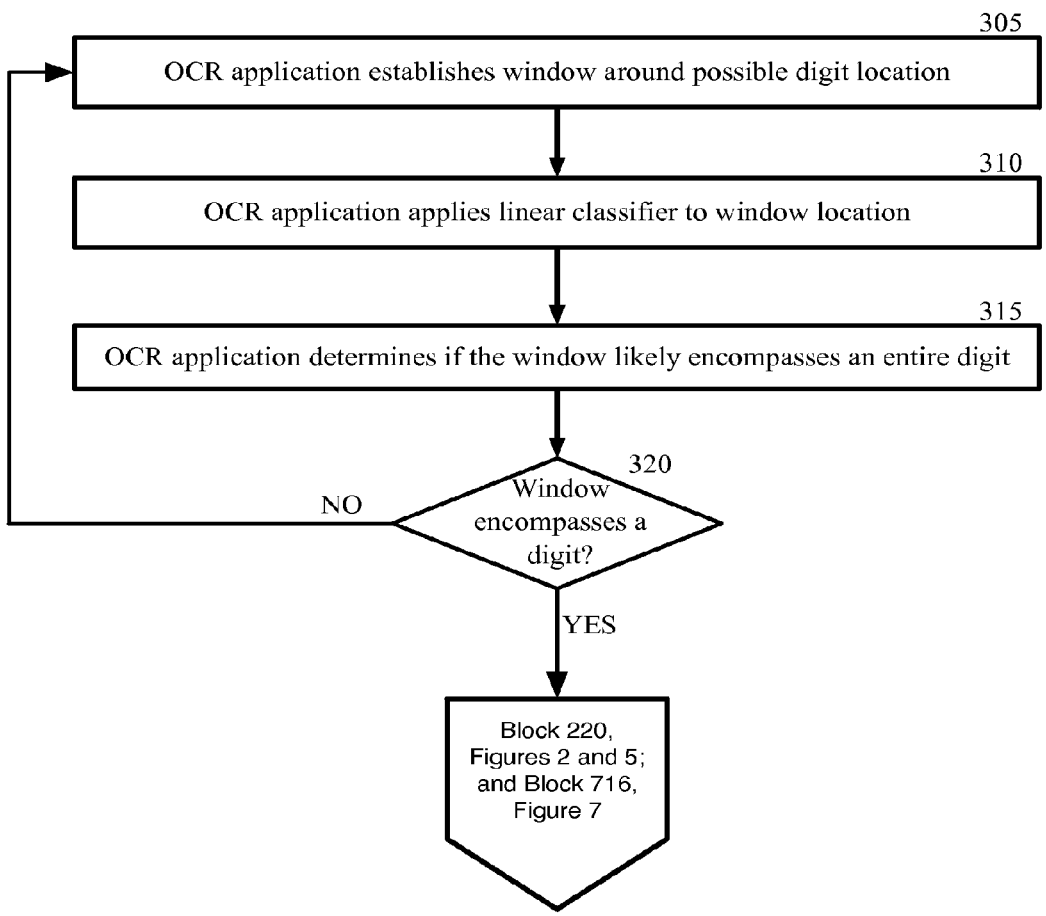
FIG. 3 is a block flow diagram depicting methods for applying a linear classifier to locate digits, in accordance with certain example embodiments.

FIG. 3 is a block flow diagram depicting a method 215 for applying a linear classifier to locate digits, in accordance with certain example embodiments, as referenced in block 215 of FIG. 2.

In block 305, the OCR application 115 isolates a small window on the card 102. The window is a section of the image of a configured size that encompasses the data in the window. For example, the window is a section of the image a certain number of pixels by a certain number of pixels wide. The window may be located in an area where a digit is expected to be located. The window may be slightly larger than the expected digit to allow an entire digit to be encompassed by the window, but not so large as to encompass more than one digit or more than a limited number of digits. Other windows may be utilized that encompass multiple digits.

In block 310, the OCR application 115 applies a linear classifier or other suitable classifier to the window. The OCR application 115 may use a simple linear support vector machine ("SVM") to distinguish a digit from the background. An SVM is a machine learning tool that may utilize algorithms to analyze data and recognize patterns. The SVM linear classifier the OCR application 115 applies to the window may use less processing capacity from the user computing device 110 than a more typical OCR algorithm.

In block 315, the OCR application 115 determines if the window likely encompasses an entire digit. The classifier determines a confidence level that the image in the window is a digit. For example, if the window completely encompasses a single digit, the classifier may determine that the image is likely to be a digit and provide a high confidence level. The OCR application 115, or another suitable party, may configure a threshold value of the confidence level for determining if the window encompasses a digit.

In block 320, if the results of the classifier indicate that the confidence level is under a threshold and thus does not encompass a digit, then the method 215 follows the "NO" branch of block 320 to block 305. If the results of the classifier indicate that the confidence level is equal to or greater than a threshold and thus does encompass a digit, then the method 215 follows the "YES" branch of block 320 to block 220 of FIG. 2.

Following the NO branch of block 320 to block 305, the OCR application 115 shifts and/or resizes the window position on the image. The OCR application 115 may shift the window location by as little as a pixel on the image or by any other distance. The OCR application 115 may shift the window horizontally, vertically, or diagonally. The size of the window may be altered, for example, by enlarging or decreasing a size of the window. Any suitable revision to the window may be performed.

The OCR application 115 reapplies the linear classifier to the new window and determines if a digit is encompassed by the window as described in blocks 310, 315, and 320. The OCR application 115 may shift the window and run linear classifiers until all the locations of all digits are identified and the confidence levels within those locations are all over the threshold. Additionally or alternatively, all possible locations of the image may be analyzed.

If the digit locations are not identified with a required confidence level, the OCR application 115 reports a failure to the user 101 and abandons the attempt. Alternatively, the OCR application 115 may select the digit locations with the highest confidence levels despite the confidence levels being below the threshold.

Following the YES branch of block 320 and returning to FIG. 2, in block 220, the OCR application 115 applies an OCR algorithm to the digits in the selected window locations. The OCR application 115 may apply the OCR algorithm to all of the windows or digits that are over the confidence level, to an individual window or digit, or to any portion of the card image. The OCR application 115 performs an OCR algorithm or other computer implemented process to determine the card information. In an example, the OCR application 115 may use an OCR algorithm to analyze the digit locations in the image of the card 102 to extract the account number of a credit card. The extracted number may be presented to the user 101 for verification, stored in the OCR application 115, transmitted to a remote computer, stored in a digital wallet application module 111, or used in any suitable manner. Other information, such as the user name, expiration date, security code, or any suitable information, may also be extracted from the image.

In block 225, the OCR application 115 supplies the extracted data to a requestor, such as a digital wallet application module 111, point of sale terminal, payment processing system, website, or any suitable application or system that the user desires. The extracted data may be used by an application on the user computing device 110. The extracted data may be transmitted via an Internet connection over the network, via a near field communication ("NFC") technology, emailed, texted, or transmitted in any suitable manner.

Figure 4:
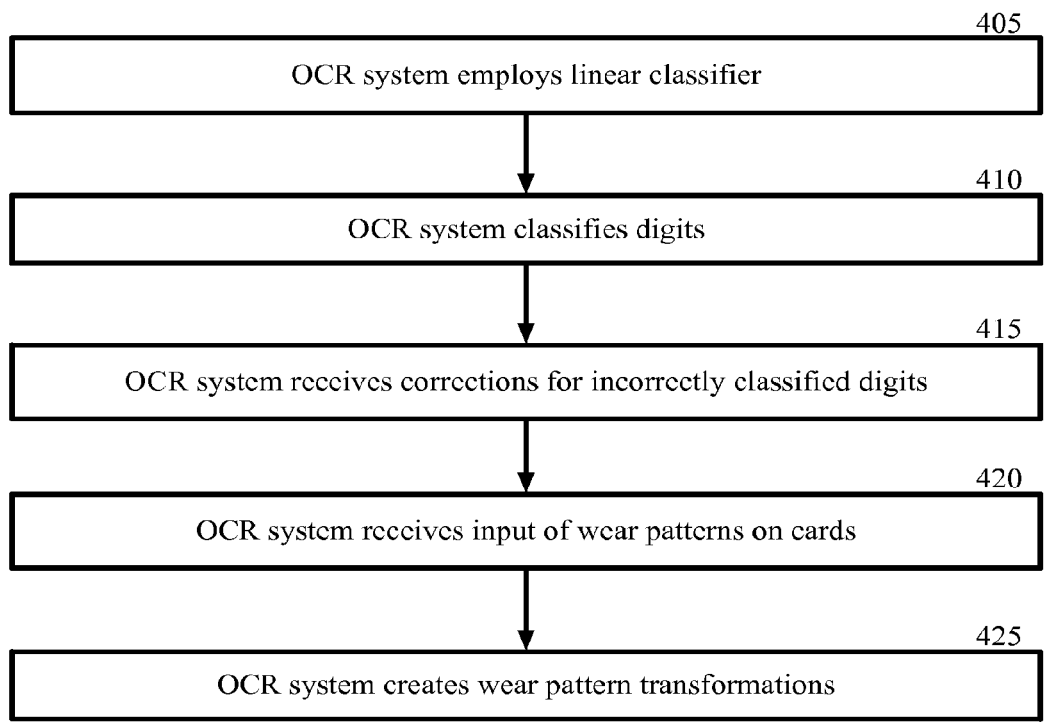
FIG. 4 is a block flow diagram depicting methods for an OCR system to modify a linear classier to identify wear patterns, in accordance with certain example embodiments.

FIG. 4 is a block flow diagram depicting a method 400 for an OCR system 120 to modify a linear classier to identify wear patterns, in accordance with certain example embodiments. Embossed digits, printed digits, and other digits on a card often become distressed over a period time. One source of distress is wear from being inserted into and out of a wallet, purse, pocket, or other enclosure. The digits can develop a wear pattern from being forced into an enclosure repeatedly. For example, if a user forces a credit card into a slot in a wallet from the top down, the card can develop a wear pattern from the friction of the card on the wallet material.

The method 400 of modifying a classifier may be performed by any computing device or system, such as by the user computing device 110, the OCR system 120, the payment processing system 140, the card issuer system 170, or any suitable party. Examples herein are shown with the modifications being performed by the OCR system 120.

In block 405, the OCR system 120 employs a linear classifier. The OCR system 120 or any other suitable system may train a classifier to identify the wear patterns. The classifier may be trained by receiving data from an operator or another suitable party. The classifier analyzes images of cards. The classifier may identify digits in a manner as described herein or in any suitable manner.

In block 410, the OCR system 120 classifies digits to train the classifier. The classifier analyzes images of cards such as card 102. The images may be taken from actual card scans, generated by a computer, designed by an operator, taken from a demonstration group, or obtained from any suitable source. The classifier may identify digits in a manner as described in method 215 of FIG. 3 or in any suitable manner.

In block 415, the OCR system 120 receives corrections for incorrectly classified digits. The OCR system 120 operator, a user 101, or another suitable party may provide corrections for incorrectly classified digits. The operator may view the results of a classification on a user interface of the OCR system web server 124 and correct classification errors. For example, a window may be classified as not containing a digit when a digit was completely contained in the window but worn away sufficiently that the OCR system 120 does not detect the digit. The operator instructs the classifier that the window did contain a digit. The classifier learns that the characteristics indicated by the classification of the window are to be incorporated in future classifications. The classifier learns from the corrections to more accurately interpret the image data. For example, a particular wear pattern may wear off a bottom half of a digit. The OCR system 120 will interpret a window encompassing the digit as not containing an entire digit, because the bottom half of the digit is missing. However, the top half of the supplied digit can be used to interpret the whole digit, and the classifier can be instructed to recognize the whole digit based on the top half of the supplied digit. Additionally, the classifier can be instructed to identify the top half of digits in other windows (or when analyzing other cards) and to supply the missing bottom half of the digit based on the applied wear pattern.

In block 420, the OCR system 120 receives input of wear patterns on cards 102. The OCR system 120 may recognize wear patterns on the cards 102. Additionally or alternatively, an operator of the OCR system 120 may provide instructions on wear pattern recognition. The operator may train the classifier by providing cards 102 with actual wear patterns or simulated wear patterns.

For example, the digits on a card 102 may have a wear pattern that was created by sliding the card 102 into a holder. The classifier may be instructed to recognize the wear patterns. The classifier may further be instructed to categorize the wear patterns. For example, a wear pattern may be associated with a category such as "top down wear."

In an example, a user 101 employs a wallet that has a slotted opening into which a card 102 slides. If the user 101 places the card 102 into the wallet by forcing the top of the card 102 into the slot, the card digits may wear from the top downward. This wear pattern may be categorized as "top down wear." Other wear pattern categories might include "left side horizontal wear," "diagonal wear," "bottom up wear," or in any suitable category.

In block 425, the OCR system 120 may create transformations to apply to classification data. For example, the OCR system 120 may learn what optical effect each category of wear pattern creates in the card image, and in particular, to specific digits. The OCR system 120 may create a transformation to apply to classification data that allows the classification data to be rectified, or otherwise revised, to a standard digit image.

Figure 5:
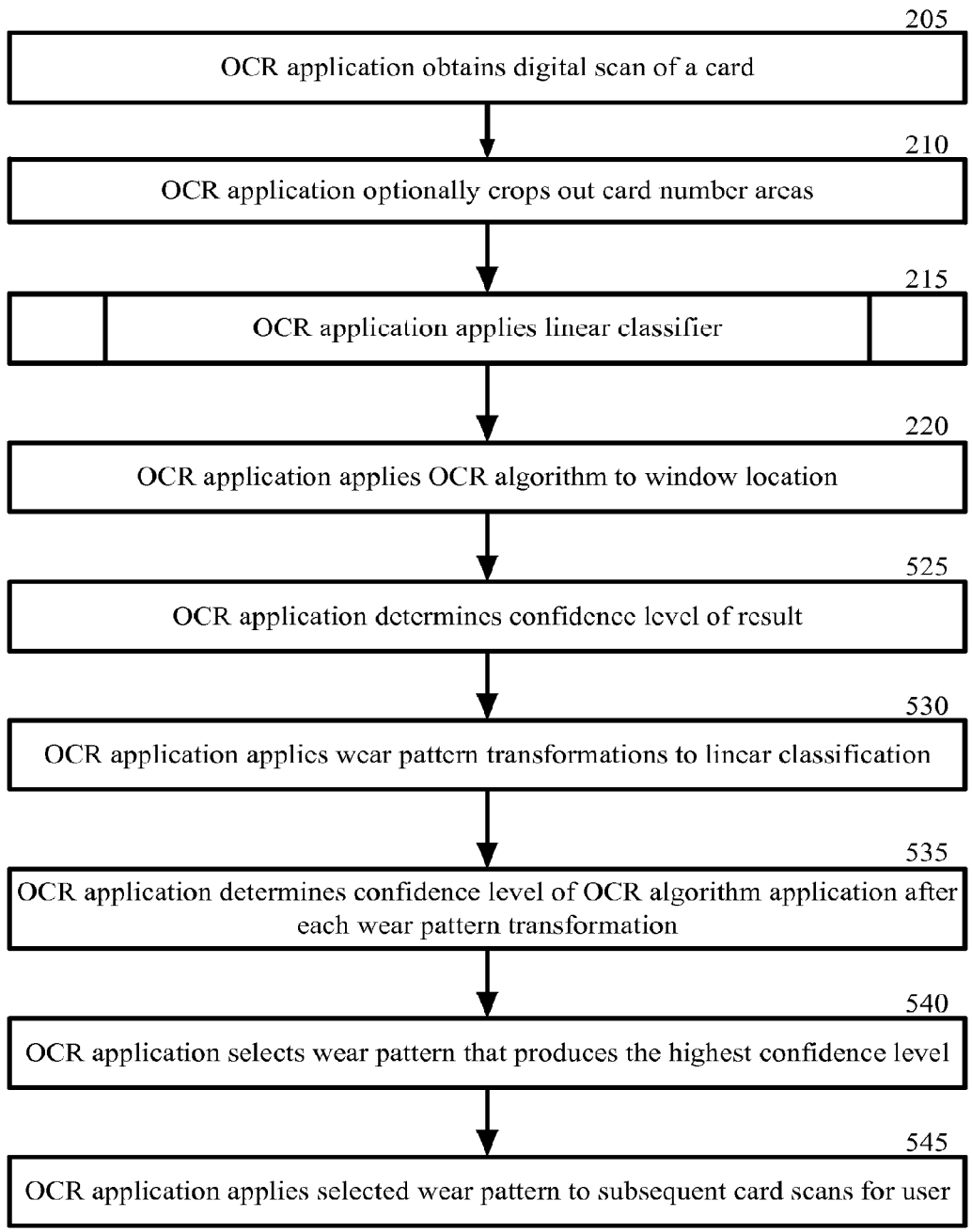
FIG. 5 is a block flow diagram depicting methods for extracting account information using wear patterns, in accordance with certain example embodiments.

FIG. 5 is a block flow diagram depicting methods for extracting account information using wear patterns, in accordance with certain example embodiments.

Blocks 205 and 210 are performed as described in blocks 205 and 210 of FIG. 2. Block 215 is performed as described in method 215 of FIG. 3. Upon identification of the digits, the method 215 returns to block 220 of FIG. 5. Block 220 is performed as described in block 220 of FIG. 2.

In block 525, the OCR application 115 determines a confidence level of a result of performing the OCR algorithm on the image. The confidence level may be determined via any suitable process such as a mathematical determination of the accuracy of the OCR algorithm or any other manipulation of the data of the results.

In block 530, the OCR application 115 applies one or more transformations to the linear classification of the data, such as a top down wear transformation. For example, in a "top down wear" transformation, the OCR application 115 will identify the bottom portion of a number (in other words, a number missing at least a portion of the top of the number). Then, using the bottom portion of the number, the OCR application 115 can identify the entire number.

In block 535, the OCR application 115 determines the confidence level of the result after the transformation. The confidence level may be determined by comparing the most likely result from the second most likely result. For example, if the top result has a 70% likelihood and the second result has a 30% likelihood, the confidence level may be predicted based on the difference between the two likelihoods. The OCR application 115 may determine the confidence level improves after each of the transformations. If the confidence level improves after a transformation, then the OCR application 115 determines that the card in the image has a wear pattern associated with the associated wear pattern.

In block 540, the OCR application 115 selects the top performing wear pattern transformation result. The top performing wear pattern may be the wear pattern that produces the highest confidence levels in the results of the transformation. For example, the top down wear pattern transformation may produce an 80% confidence level and the bottom up wear pattern transformation may produce a 60% confidence level. The top down wear pattern transformation will be the top performing result. The OCR application 115 may additionally or alternatively combine wear pattern transformations in any combination that provides a suitable result. For example, if a user randomly places card in his card holder, then that user's cards may exhibit multiple, different wear patterns.

In block 545, after determining the wear pattern associated with the card 102 of the user 101, the OCR application 115 applies the wear pattern to all subsequent card images. That is, when the user 101 applies a classification and an OCR algorithm to future card images, the OCR application 115 applies the determined wear pattern to the classification. The OCR application 115 assumes that the user 101 creates a similar wear pattern on all cards 102 utilized by the user 101. For example, the user 101 may store all cards in a similar manner in a wallet or other card holder. Thus, a similar wear pattern may be created on all cards 102 of the user 101. The OCR application 115 uses the predicted wear pattern to improve the accuracy and the speed of the OCR application 115. By predicting the wear pattern of the user 101 and applying the associated wear pattern to the user data at the beginning of the process, the OCR application 115 may more accurately interpret the data. The OCR application 115 may additionally conduct the OCR process faster by using the transformed data.

Figure 6:
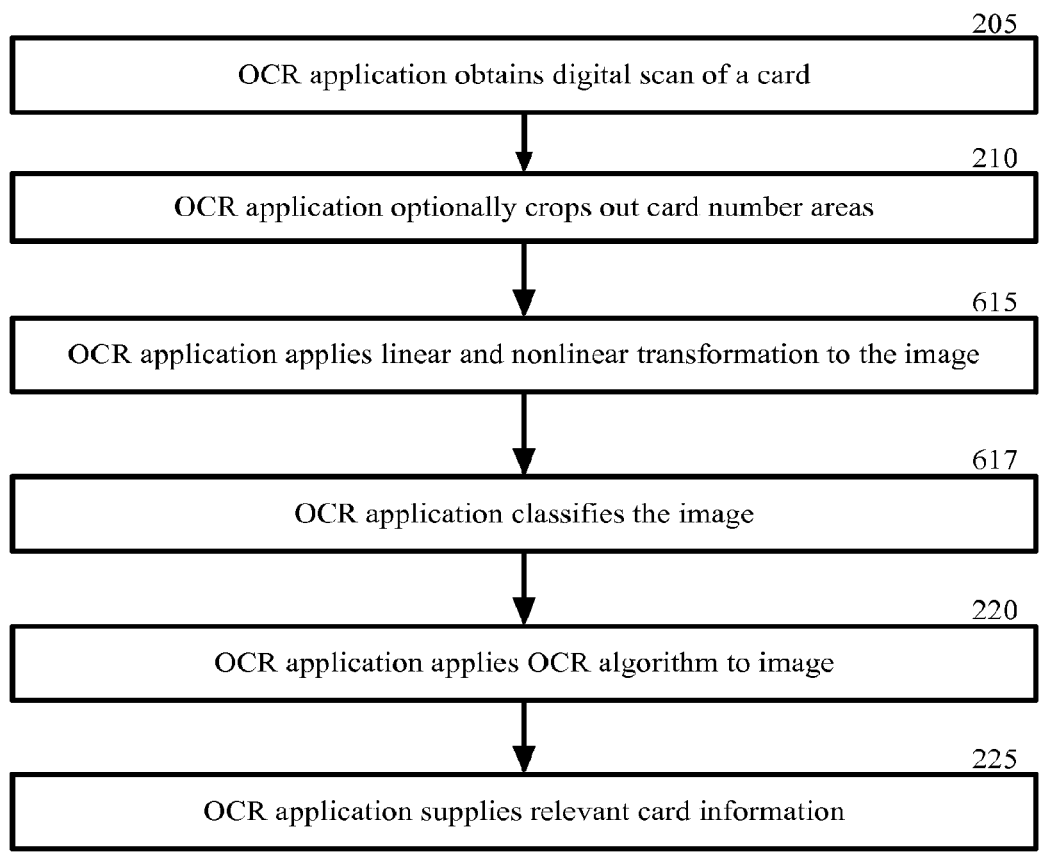
FIG. 6 is a block flow diagram depicting methods for extracting account information using linear and non-linear classifiers, in accordance with certain example embodiments.

FIG. 6 is a block flow diagram depicting methods for extracting account information using linear and non-linear classifiers, in accordance with certain example embodiments.

Blocks 205 and 210 are performed as described in blocks 205 and 210 of FIG. 2.

In block 615 the OCR application 115 applies a linear transformation and a nonlinear transformation method to the card image. Linear transformation methods may include techniques such as simple linear support vector machines ("SVM"), principal components analysis ("PCA"), and linear discriminant analysis ("LDA"). The classification method may be selected to reduce the dimensionality of the input features while minimizing the impact on the accuracy of the results. The OCR application 115 may additionally or alternatively select a method that requires the least processing capacity from the user network device. An example of nonlinear transformation methods includes Random Fourier Feature Mapping ("RFFM"). The nonlinear transformation method improves the accuracy of the data. By first reducing the dimensionality of the data with the linear classification methods and then increasing the dimensionality with the nonlinear transformation methods, the OCR application achieves higher accuracy with reduced processing costs.

The OCR application 115 generates more accurate results with less processing requirements by combining linear and nonlinear transformation methods. The OCR application 115 applies a linear transformation to the image data to reduce the dimensionality and then applies the nonlinear classification to increase the accuracy of the results. Dimensionality reduction is the process of reducing the number of random variables under consideration. The main linear technique for dimensionality reduction, principal component analysis, performs a linear mapping of the data to a lower dimensional space in such a way that the variance of the data in the low-dimensional representation is maximized. The covariance matrix of the data is constructed and the eigenvectors on this matrix are computed. The eigenvectors that correspond to the largest eigenvalues (the principal components) can now be used to reconstruct a large fraction of the variance of the original data. The original space (with dimension of the number of points) has been reduced (with data loss, but hopefully retaining the most important variance) to the space spanned by a few eigenvectors.

By first reducing the dimensionality of the data with the linear transformation methods and then increasing the dimensionality with the nonlinear transformation methods, the OCR application 115 achieves higher accuracy with reduced processing costs.

In block 617, the OCR application 115 applies a classification method to the card image. The classification method may be linear or nonlinear, or employ any available classification method.

In block 220, the OCR application 115 applies an OCR algorithm to the resulting image as described in block 220 of FIG. 2.

In block 225, the OCR application 115 supplies the card information as described in block 225 of FIG. 2.

Figure 7:
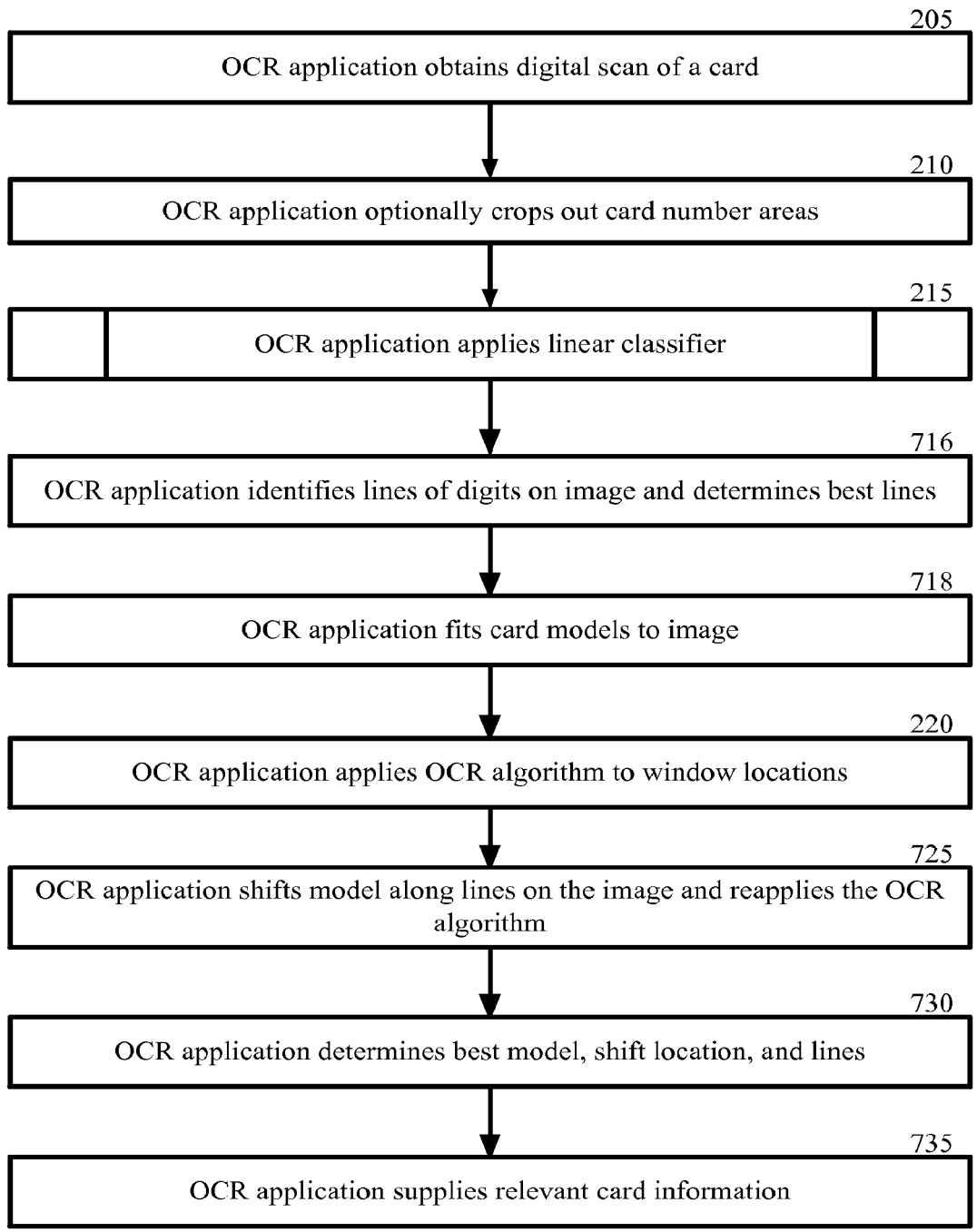
FIG. 7 is a block flow diagram depicting methods for extracting account information using card models, in accordance with certain example embodiments.

FIG. 7 is a block flow diagram depicting methods for extracting account information using card models, in accordance with certain example embodiments.

Blocks 205 and 210 are performed as described in blocks 205 and 210 of FIG. 2.

In block 215, the OCR application 115 applies a linear classifier to the image as described in method 215 of FIG. 3. The OCR application 115 determines the potential digit locations. That is, the OCR application 115 can score each potential digit window and select the windows most likely to contain a digit. The method 215 proceeds to block 716 of FIG. 7.

In block 716, the OCR application 115 identifies lines on the card image by fitting lines to the likely digits. That is the OCR application 115 may apply lines to the image that are fitted to the top or bottom of a series of digits. For example, the digits comprising the user identification number of a credit card are typically printed or embossed in a line from left to right across the face of the card 102. The OCR application 115 recognizes that the potential digits are arranged in a line or a series of lines. The lines most likely to be lines of digits may be stored. For example, the OCR application 115 may store the top scoring 3 or 4 lines.

In block 718, the OCR application 115 fits card models to the image. The OCR application 115 maintains a series of card models in a database or other storage location. The card models indicate the manner in which the digits are displayed on the card 102. For example, certain card issuers display the account numbers in a particular spacing configuration and at a certain location on the card 102. A certain card issuer system 170 may display the digits of the account number in a continuous string of digits without spaces. Another card issuer system 170 may display the digits of the account number in groups of 4 digits divided by spaces. Another card issuer system 170 may display the digits of the account number in groups of 4 digits with a double space in the center of the digits. Any suitable digit grouping may be identified and stored in the database.

The card models to use in the comparison may be selected based on knowledge of the card types associated with the user 101. For example, if the user 101 typically employs cards from a particular card issuer system 170, then card models associated with the card issuer system 170 may be used in the comparison. In another example, the OCR application 115 may recognize the card type in the image and employ associated card models. Any suitable card model selection criteria may be employed.

The OCR application 115 fits the card models to the image. The OCR application 115 may fit the model along the lines stored from the image. That is, the OCR application 115 fits the model along each of the lines that were determined to be likely digit location lines. In another example, the model is fit to every location on the card image. The model may be applied in a location against the left edge of the card and then shifted one pixel at a time horizontally or vertically to find the best fit. Any other method of fitting the model to the image may be employed.

In block 220, the OCR application 115 applies an OCR algorithm to the potential digit locations determined by the lines, the windows, and the models. The OCR algorithm application is substantially similar to block 220 of FIG. 2.

In block 725, the OCR application 115 shifts the model along the determined lines on the card image. The OCR application 115 determines the best digit recognition scores from application of the OCR algorithm to the different model locations.

In block 730, the OCR application 115 determines the model that creates the best digit recognition scores. For example, a model that has the digits of the account number in groups of 4 digits may generate the best results. The OCR application 115 may predict a credit card issuer that is associated with the account number groupings. The OCR application 115 uses the knowledge of the credit card issuer to predict other data locations on the image or for any suitable validation, prediction, or verification purposes.

The OCR application 115 selects the best digits located by the lines, the windows, and the models. The OCR application 115 verifies the selected digits as the most likely digits. The verification may be presented to the user 101.

In block 735, the OCR application 115 supplies the relevant card information to a requestor, such as a digital wallet application module 111, point of sale terminal, payment processing system, website, or any suitable application or system that the user desires. The extracted data may be used by an application on the user computing device 110. The extracted data may be transmitted via an Internet connection over the network, via a near field communication ("NFC") technology, emailed, texted, or transmitted in any suitable manner.

Other Example Embodiments

Figure 9:
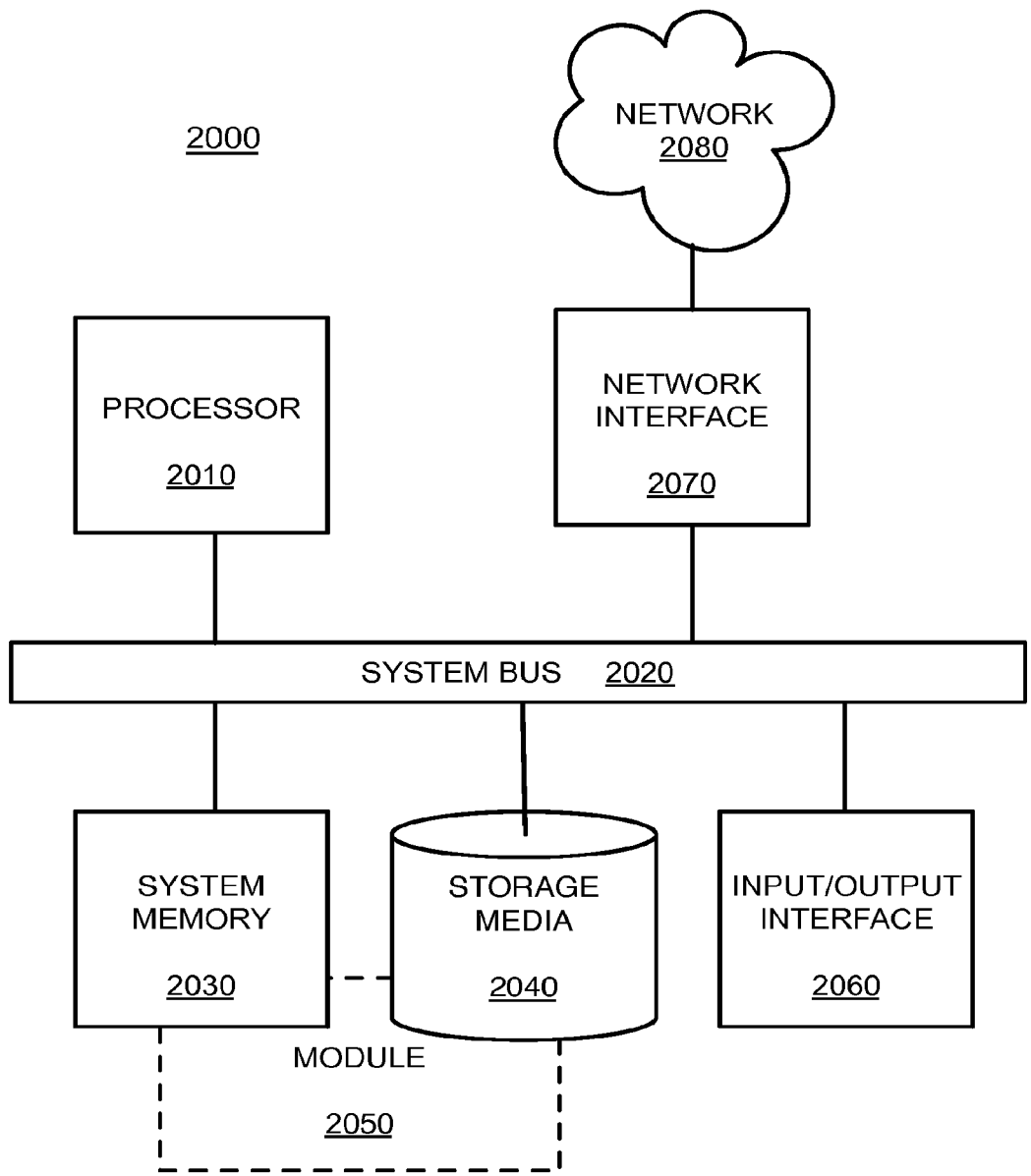
FIG. 9 is a block diagram depicting a computing machine and a module, in accordance with certain example embodiments.

FIG. 9 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain example embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with a opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the invention claimed herein.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method for extracting card information, comprising:
   receiving, by one or more computing devices, an image of a card;
   identifying, by the one or more computing devices, a first area of the image, the first area being selected as a potential location of one or more digits on the image;
   performing, by the one or more computing devices, a classification algorithm on data encompassed by the first area;
   identifying, by the one or more computing devices, one or more lines of potential digits on the image based on the results of the application of the classification;
   comparing, by the one or more computing devices, the image to one or more card models associated with a user, the one or more models comprising digit distribution patterns of data displayed on the image; and
   performing, by the one or more computing devices, an optical character recognition algorithm on areas of the card that are anticipated by the one or more computing devices as comprising digits based on the application of the card models and the identified lines.

2. The method of claim 1, further comprising selecting, by the one or more computing devices, the one or more card models based at least in part on stored user data indicating card types that are associated with the user.

3. The method of claim 1, further comprising comparing, by the one or more computing devices, the card model associated with the user to a database of card types to determine a card type of the card in the image.

4. The method of claim 1, wherein the identifying of one or more lines of potential digits is performed based on Random Sample Consensus.

5. The method of claim 1, wherein the card models represent digit distribution patterns for known card issuers.

6. The method of claim 1, wherein the lines are identified by analyzing, by the one or more computing devices, a position of the identified digits relative to each other and fitting lines to the positions.

7. The method of claim 1, wherein the card is a credit card, a debit card, an identification card, a loyalty card, an access card, or a stored value card.

8. A computer program product, comprising:
a non-transitory computer-readable storage device having computer-executable program instructions embodied thereon that when executed by a computer cause the computer to extract card information, comprising:
computer-executable program instructions to receive an image of a card;
computer-executable program instructions to identify a first area of the image, the first area being selected as a potential location of one or more digits on the image;
computer-executable program instructions to perform a classification algorithm on data encompassed by the first area;
computer-executable program instructions to identify one or more lines of potential digits on the image based on the results of the application of the classification;
computer-executable program instructions to compare the image to one or more card models associated with a user, the one or more models comprising digit distribution patterns of data displayed on the image;
computer-executable program instructions to perform an optical character recognition algorithm on areas of the card that are anticipated by the one or more computing devices as comprising digits based on the application of the card models and the identified lines;
computer-executable program instructions to determine a confidence level of one or more results of the applications of the optical character recognition algorithm to the image; and
computer-executable program instructions to verify a particular result based at least in part on a determination that the confidence level is the highest of the determined confidence levels.

9. The computer program product of claim 8, the computer-executable program instructions further comprising selecting the one or more card models based at least in part on stored user data indicating card types that are associated with the user.

10. The computer program product of claim 8, the computer-executable program instructions further comprising comparing the model associated with the authenticated result to a database of card types to determine a card type of the card in the image.

11. The computer program product of claim 8, wherein the classification algorithm is a support vector machine.

12. The computer program product of claim 8, wherein the card models represent digit distribution patterns for known card issuers.

13. The computer program product of claim 8, wherein the lines are identified by analyzing a position of the identified digits relative to each other and fitting lines to the positions.

14. The computer program product of claim 8, wherein the card is a credit card, a debit card, an identification card, a loyalty card, an access card, or a stored value card.

15. A system for extracting financial card information with relaxed alignment, the system comprising:
a storage device;
a processor communicatively coupled to the storage device, wherein the processor executes application code instructions that are stored in the storage device to cause the system to:
receive an image of a card from a camera;
identify a first area of the image, the first area being selected as a potential location of one or more digits on the image;
perform a classification algorithm on data encompassed by the first area;
identify one or more lines of potential digits on the image based on the results of the application of the classification;
compare the image to one or more card models associated with a user, the one or more models comprising digit distribution patterns of data displayed on the image; and
perform an optical character recognition algorithm on areas of the card that are anticipated by the one or more computing devices as comprising digits based on the application of the card models and the identified lines.

16. The system of claim 15, the processor executing further application code instructions that are stored in the storage device and that cause the system to select the one or more card models based at least in part on stored user data indicating card types that are associated with the user.

17. The system of claim 15, the processor executing further application code instructions that are stored in the storage device and that cause the system to compare the model associated with the user to a database of card types to determine a card type of the card in the image.

18. The system of claim 15, wherein the classification algorithm is a support vector machine.

19. The system of claim 15, wherein the card models represent digit distribution patterns for known card issuers.

20. The system of claim 15, wherein the card is a credit card, a debit card, an identification card, a loyalty card, an access card, or a stored value card.

* * * * *